(12) United States Patent
Yamanaka

(10) Patent No.: US 8,072,851 B2
(45) Date of Patent: Dec. 6, 2011

(54) POSITION CONTROL APPARATUS AND OPTICAL APPARATUS

(75) Inventor: Tomoaki Yamanaka, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 855 days.

(21) Appl. No.: 11/449,518

(22) Filed: Jun. 8, 2006

(65) Prior Publication Data

US 2006/0279739 A1 Dec. 14, 2006

(30) Foreign Application Priority Data

Jun. 10, 2005 (JP) ................................. 2005-170888

(51) Int. Cl.
*G11B 7/00* (2006.01)
*G02B 7/28* (2006.01)

(52) U.S. Cl. ....................... 369/44.28; 348/347; 356/482

(58) Field of Classification Search ............... 369/44.28; 348/347, 348, 354, 360, 364
See application file for complete search history.

(56) References Cited

U.S. PATENT DOCUMENTS

| | | | | |
|---|---|---|---|---|
| 6,229,568 | B1 * | 5/2001 | Kawaguchi et al. | 348/350 |
| 6,577,343 | B2 * | 6/2003 | Ohkawara | 348/347 |
| 6,683,652 | B1 * | 1/2004 | Ohkawara et al. | 348/347 |
| 6,924,941 | B2 * | 8/2005 | Okada et al. | 359/698 |
| 7,493,033 | B2 * | 2/2009 | Triteyaprasert et al. | 396/85 |

FOREIGN PATENT DOCUMENTS

| | | |
|---|---|---|
| JP | 62-56911 A | 3/1987 |
| JP | 62-83711 A | 4/1987 |
| JP | 7-281084 A | 10/1995 |
| JP | 1-162279 | 6/1998 |
| JP | 11-133295 A | 5/1999 |
| JP | 2003-107326 A | 4/2003 |
| JP | 2003-167183 A | 6/2003 |
| JP | 2004-325517 A | 11/2004 |

OTHER PUBLICATIONS

Notice of Reasons for Rejection issued in corresponding Japanese Patent Application No. 2005-170888 dated Aug. 10, 2010. English Translation provided.

* cited by examiner

*Primary Examiner* — Hoa T Nguyen
*Assistant Examiner* — Kim Chu
(74) *Attorney, Agent, or Firm* — Rossi, Kimms & McDowell LLP

(57) ABSTRACT

A position control apparatus (optical apparatus) is disclosed which is capable of preventing disadvantages caused by the absence of a dead band while achieving a required accuracy of positional control. The position control apparatus comprises a controller which controls the drive of an object (optical member) so that the position of the object, which detected by a position detector, moves closer to a target position. The controller has a control function which does not drive the object in a case where the difference between the position detected by the position detector and the target position is within a predetermined range, and changes the predetermined range according to control modes relating to the drive of the object.

3 Claims, 7 Drawing Sheets

PRIOR ART

POSITION CONTROL APPARATUS AND OPTICAL APPARATUS

BACKGROUND OF THE INVENTION

The present invention relates to position control apparatuses which drive an object and control its position, such as optical apparatuses which control an optical element.

In positional servo controls which cause the position of an object to follow a target position, a controller generally has a control function which, in the case where the difference between the detected position of the object and the target position is within a predetermined range, assumes that the position of the object reaches the target position and thereby does not drive the object. In other words, the controller provides a dead band of control.

FIG. 6 shows a block diagram of a position control apparatus having a dead band. A target position signal set by a target position setting part 601 and a position detection signal that is an output of a position signal converter 606 are input to a subtracter 608. A deviation signal obtained by the subtracter 608 (a signal showing the difference between the target position signal and the position detection signal) is input to a dead-band providing part 602. The dead-band providing part 602 sets the value of the deviation signal to zero in a case where the value of the deviation signal from the subtracter 608 is within a predetermined dead band. Thereby, the control state becomes a non-controlled state in which the servo control is not performed.

FIG. 7 shows the input-output relationship of the dead-band providing part 602. The output of the dead-band providing part 602 becomes zero when the deviation amount shown by the input deviation signal (positional deviation) is smaller than the dead band. The dead-band providing part 602 generates an output proportional to the positional deviation when the positional deviation is larger than the dead band.

FIG. 8 shows the relationship between the target position signal and the position detection signal in the position control apparatus having the dead band. A normal position control (normal drive) is performed outside the dead band, and thereby the position detection signal follows the target position signal. However, inside the dead band, since the output value of the deviation signal is forced to be zero, the position control is not performed, and thereby the last position before the position control is stopped is held. However, an overshoot may occur due to the inertia of an object 609 to be controlled.

The deviation signal from the dead-band providing part 602 is input to a gain/phase compensator 603. The gain/phase compensator 603 performs a gain and phase compensations on the deviation signal to generate a driving signal for driving an actuator. The generated driving signal is input to an linear actuator 605 via a driver 604. The linear actuator 605 thereby is driven to move the object 609 to be controlled to a target position.

The position of the object 609 to be controlled is detected by a position detector 607. The output of the position detector 607 is converted into a signal having the same dimension as that of the target position signal, and fed back to the subtracter 608. The control with such a dead band has a purpose of preventing a busy control feeling, generation of abnormal noise due to frequent driving of the object, and premature deterioration of the control performance.

On the other hand, positional control with high accuracy is often required in the field of precision apparatuses such as optical apparatuses. Therefore, an art enabling positional control with high accuracy has been proposed in Japanese Patent application Laid-Open No. H01(1989)-162279, in which a dead band is provided in a state that an object is away from a target position to some extent, and the dead band is eliminated in a state that the object is near the target position.

However, in the art proposed in Japanese Patent application Laid-Open No. H01(1989)-162279, there still remains a problem that the above mentioned busy control feeling and abnormal noise are generated and the control performance deteriorates near the target position since the dead band is eliminated. Therefore, the above-mentioned problem occurs even when the positional control with high accuracy is not required.

BRIEF SUMMARY OF THE INVENTION

An object of the present invention is to provide a position control apparatus and an optical apparatus, which are capable of preventing disadvantages caused by the absence of a dead band while achieving a required accuracy of positional control, by providing an appropriate dead band according to the control contents (control modes) for an object.

According to an aspect, the present invention provides a position control apparatus which comprises a controller which controls the drive of an object so that the position of the object, which detected by a position detector, moves closer to a target position. The controller has a control function which does not drive the object in a case where the difference between the position detected by the position detector and the target position is within a predetermined range, and changes the predetermined range according to control modes relating to the drive of the object.

According to another aspect, the present invention provides an optical apparatus which comprises a controller which controls the drive of an optical element so that the position of the optical element, which detected by a position detector, moves closer to a target position. The controller has a control function which does not drive the optical element in a case where the difference between the position detected by the position detector and the target position is within a predetermined range, and changes the predetermined range according to control modes relating to the drive of the optical element.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
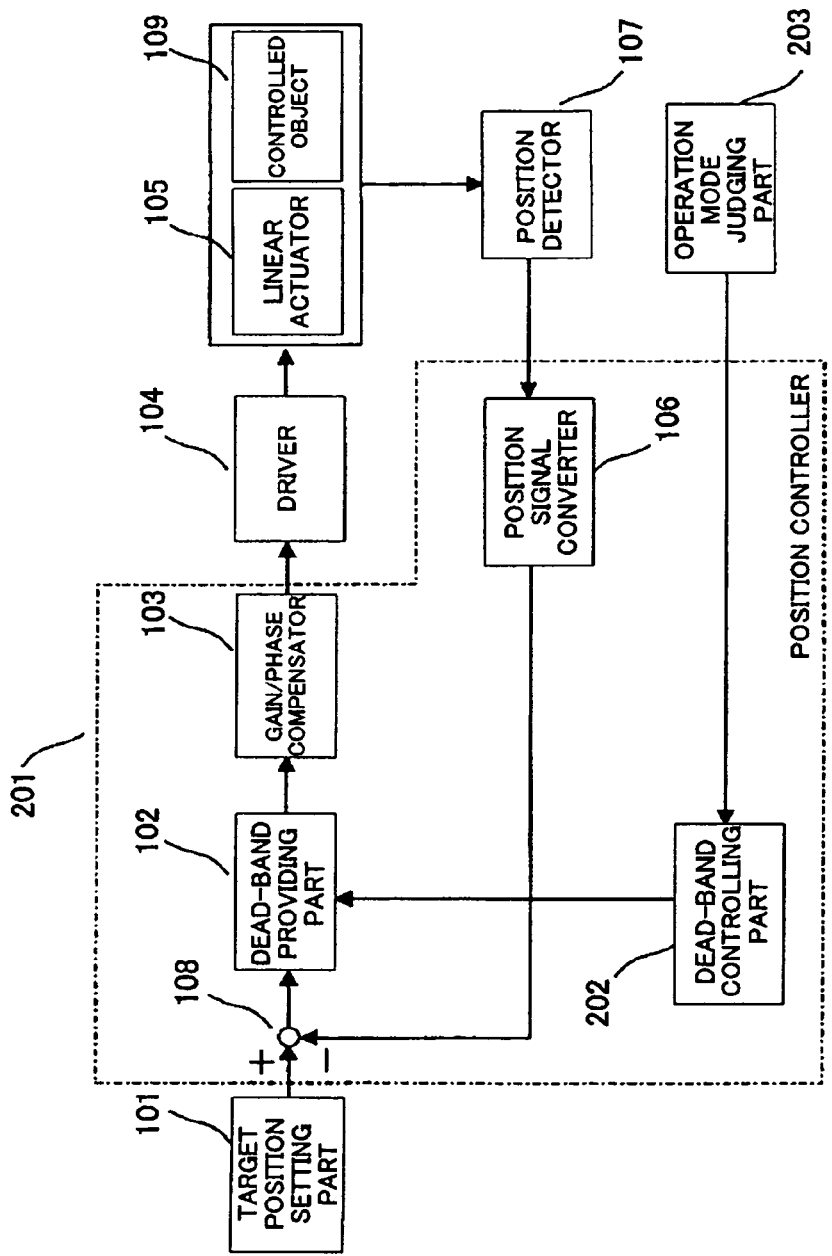
FIG. 1 is a block diagram showing the configuration of the position control apparatus that is Embodiment 1 of the present invention.

FIG. 1 shows the configuration of a position control apparatus that is Embodiment 1 of the present invention. This position control apparatus performs the servo control for controlling an actuator which drives an object so that the object moves closer to a target position (preferably, the position of the object coincides with the target position).

In the position control apparatus, a target position setting part 101 generates a signal showing the target position of the object (hereinafter, referred to as a target position signal). A position signal converter 106 converts the output signal from a position detector 107 into a signal showing the position of the object (hereinafter, referred to as a position detection signal) These target position signal and the position detection signal are input to a subtracter 108.

The subtracter 108 generates a deviation signal showing the difference between the target position signal and the position detection signal, and inputs it to a dead-band providing part 102.

The dead-band providing part 102 sets the value of an output deviation signal to zero in a case where the value of the deviation signal input from the subtracter 108, that is, the difference between the target position signal and the position detection signal is within a predetermined range. The predetermined range is generally called a dead band or a dead zone; it is hereinafter referred to as a dead band). Thereby, the control state becomes a non-controlled state in which the servo control (that is, the drive of the object) is not performed.

In other words, the "dead band" means an input value range where the output, that is, the drive of the linear actuator 105 and object is not performed for the input, that is, the deviation signal input from the subtracter 108. The "dead band" is generally called a dead band of control.

The width (amount) of the dead band set by the dead-band providing part 102 is determined by a dead-band controlling part 202. The dead-band controlling part 202 determines the amount of the dead band which is provided by the dead-band providing part 102, based on control modes relating to the drive of the object, in other words, the judgment results of the operation mode of the position control apparatus by an operation mode judging part 203.

The operation modes (control modes) include plural operation modes whose required accuracies of coincidence between the detected position and the target position (or required positional accuracies of the object) are different from each other. The operation modes include, for example, an operation mode which gives priority to the positional accuracy, an operation mode which gives more priority to stability against noise and malfunctions than to the position accuracy. The dead band amount set for the operation mode which gives priority to the positional accuracy is smaller than that for the operation mode which gives priority to the stability.

In addition, the dead-band providing part 102 outputs, in a case where the value of the deviation signal input from the subtracter 108 is out of the dead band (the value is larger than the dead band), the deviation signal without changing its value. Thereby, the control state becomes a controlled state in which the servo control is performed.

The deviation signal output from the dead-band providing part 102 is input to a gain/phase compensator 103. The gain/phase compensator 103 performs a gain and phase compensations on the deviation signal to generate a driving signal for driving the linear actuator 105 when the value of the deviation signal is not zero.

The generated driving signal is input to the linear actuator 105 via a driver 104. Thereby, the object 109 to be controlled, which is the linear actuator 105 itself, or a member integrally provided with the linear actuator 105 is moved to the target position.

The position of the object 109 to be controlled is detected by the position detector 107. The position detector 107 outputs pulse signals at a predetermined interval according to the change of the position of the object 109 to be controlled or outputs an analog signal that increases and decreases in proportion to the change of the position. The position signal converter 106 generates the position detection signal having the same dimension as that of the target position signal by counting and adding the above-mentioned pulse signals or converting the above-mentioned analog signal into a digital signal. The position detection signal is fed back to the subtracter 108.

The drive of the object 109 to be controlled (actuator 105) towards the target position is continued until the value of the deviation signal output from the dead-band providing part 102 to which the deviation signal from the subtracter 108 was input becomes zero. Then, when the value of the deviation signal output from the dead-band providing part 102 becomes zero, the object 109 to be controlled is assumed to reach the target position and the drive thereof is stopped.

In FIG. 1, the group of constituent parts for performing a series of the positional control, which includes the dead-band controlling part 202, is shown as a position controller 201.

In this embodiment, since the amount of the dead band provided by the dead-band providing part 102 is changed according to the above-mentioned control modes (operation modes), it is possible to set the dead band amount which is most appropriate to the currently set control mode.

There is no limitation on the object to be controlled whose position is controlled by this embodiment's positional control apparatus. In other words, this embodiment's positional control apparatus can be used for the positional control of various objects.

In addition, although the description was made of the case where the linear actuator was used as an actuator to drive the object, other actuators such as a DC motor and a vibration-type actuator can be used.

Embodiment 2

The description will be made of a video camera (optical apparatus) to which the position control apparatus described in Embodiment 1 is applied with reference to FIG. 2.

Figure 2:
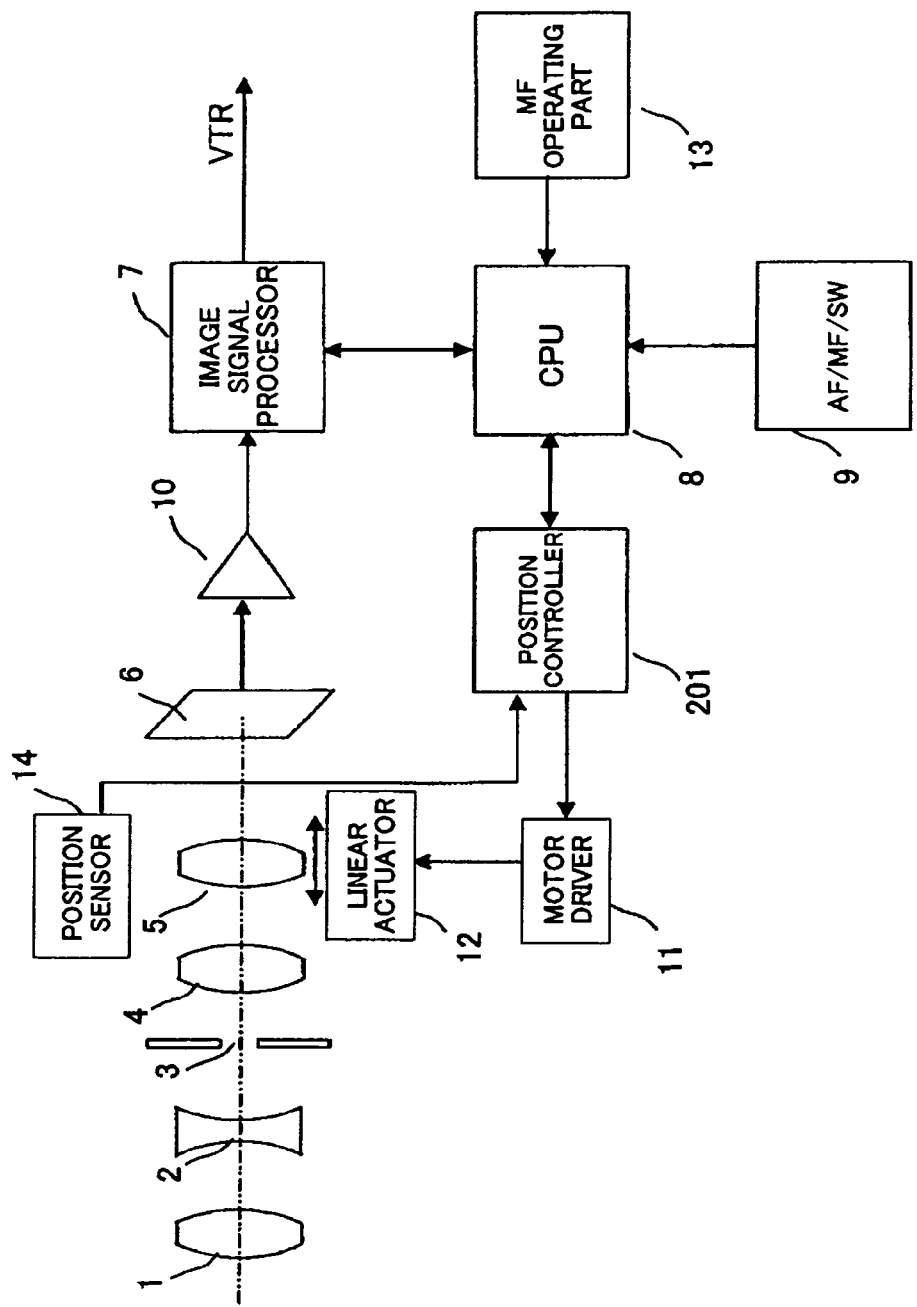
FIG. 2 is a block diagram showing the configuration of the video camera that is Embodiment 2 of the present invention.

In FIG. 2, in order from an object side (this object means a subject whose image will be taken), that is, the left side in the figure, 1 denotes a fixed front lens unit, 2 a zoom lens unit which moves in the direction of the optical axis to vary the magnification, 3 an aperture stop (iris) which adjusts the amount of light, 4 a fixed lens unit, and 5 a focus lens unit which moves in the direction of the optical axis to focus and compensate the image plane fluctuation associated with the variation of magnification. These lens units 1, 2, 4, and 5 and the aperture stop 3 constitute an image-taking optical system.

Light from an object passes through the image-taking optical system and reaches an image-pickup element 6 such as a CCD sensor or a CMOS sensor. The image-pickup element 6 converts an object image formed on its light-receiving surface into electronic signals, and the electronic signals are sent to an image signal processor 7 via an amplifier 10.

The image signal processor 7 provides various processes such as a white-balance correction and a gamma correction to create an image signal. In addition, the image signal processor 7 extracts a high frequency component from the image signal to create an AF evaluation value signal used for auto-focusing by the contrast detection method.

In the auto-focusing, the focus lens unit 5 is driven so that the AF evaluation value signal-becomes the maximum to obtain an in-focus state.

A CPU 8 controls the whole video camera. An AF/MF switch 9 is a switch for selecting a manual focus mode in which focus control is performed according to manual operations by a user or an auto focus mode in which the auto-focusing is performed.

In the manual focus mode, according to the operation of the MF operating part 13 by the user, a manual signal showing the operation direction and operation amount of the MF operating part 13 is input to the CPU 8. The CPU 8 calculates a target position of the focus lens unit 5 based on the manual signal.

On the other hand, in the auto focus mode, the CPU 8 calculates a target position of the focus lens unit 5 based on the AF evaluation value signal obtained from the image signal processor 7. Signals showing these target positions (target position signals) are input to a position controller 201. The CPU 8 inputs information on the focus mode selected with the AF/MF switch 9 to the position controller 201.

The position controller 201 includes the dead-band controlling part described in Embodiment 1, and sets the amount of the dead band of the focus control according to the information on the focus mode and the after-mentioned auto-focusing control mode (operation mode) set in the auto focus mode. The setting operation of the dead band amount will be described later in detail.

The position controller 201 receives a signal according to the position or the change of the position of the focus lens unit 5 from a position sensor 14 to create a position detection signal showing the current position of the focus lens unit 5. The position controller 201 further creates a deviation signal showing the difference between the position detection signal and the target position signal. Then, the position controller 201 performs the servo control of a linear actuator 12 in a direction in which the value of the deviation signal becomes smaller (that is, a direction in which the detected position becomes closer to the target position).

Figure 3:
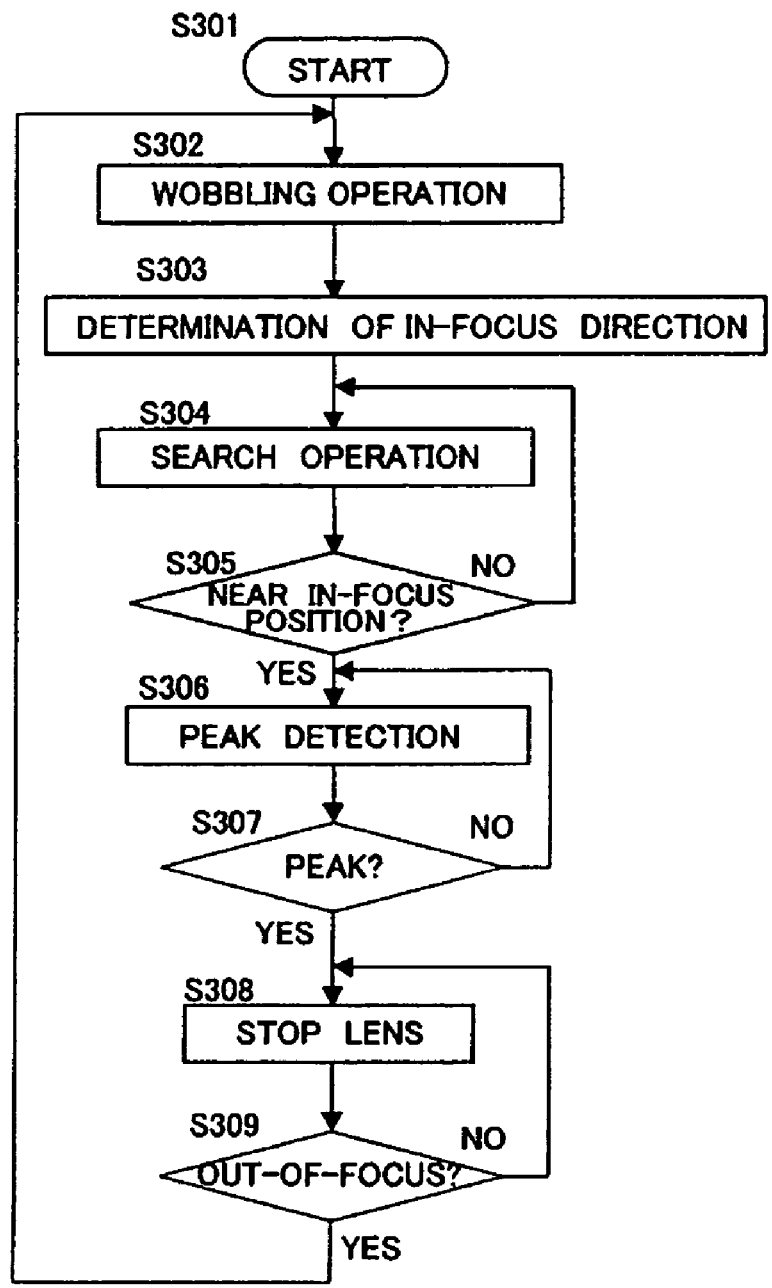
FIG. 3 is a flow chart of the auto-focus control in Embodiment 2.

The description will be made of an example of the operation of the CPU 8 in the auto focus mode with reference to the flow chart in FIG. 3. The operation of the CPU 8 is started by a trigger such as the user's operation of the AF/MF switch 9 or the power-on of the video camera. In a case where the auto focus mode is selected with the AF/MF switch 9, the operation according to this flow chart starts (S301). The symbol "S" in the flow chart means a step.

At S302, the CPU 8 performs a wobbling operation for determining whether an in-focus position exists on the side closer to the infinite position or to the close position than the current focus lens position, by using the AF evaluation value obtained from the image signal processor 7.

In the wobbling operation, the focus lens unit 5 is reciprocated with predetermined amplitude in the direction of the optical axis, and the direction in which the AF evaluation value increases, that is, the direction in which the in-focus position exists (in-focus direction) is determined. The auto-focusing control mode to perform the wobbling operation is referred to as the in-focus-direction determining mode.

At S303, the CPU 8 determines the in-focus direction based on the AF evaluation value obtained in the wobbling operation.

At S304, the CPU 8 drives the focus lens unit 5 in the in-focus direction determined at S303 in increments of a predetermined amount until the AF evaluation value becomes close to its peak, that is, the maximum. The auto-focusing control mode to perform this operation is referred to as the in-focus-position searching mode.

At S305, it is determined whether or not the AF evaluation value is close to the peak, in other words, whether or not the focus lens is located near the in-focus position. When it is determined that the focus lens is located near the in-focus position, the process proceeds to S306.

At S306, the CPU 8 reciprocates the focus lens unit 5 with predetermined amplitude to specify the in-focus position. Thereby, the in-focus position where the AF evaluation value becomes the peak is specified. The auto-focusing control mode to perform this operation is referred to as the in-focus-position determining mode.

Next, at S307, the CPU 8 determines whether or not the in-focus position was detected. When it is determined that the in-focus position was detected, the drive of the focus lens unit 5 is stopped at S308. In a case where the in-focus position shifts due to a movement of the object or a change of the scene, it is determined that it is out of focus at S309, and then the process returns to S302 to repeat the auto-focusing.

As described above, the auto focus modes include the in-focus-direction determining mode (hereinafter, referred to as the wobbling mode), the in-focus-position searching mode (hereinafter, referred to as the searching mode) the in-focus-position determining mode (hereinafter, referred to as the peak detecting mode). In these auto focus modes, information showing the current mode is sent from the CPU 8 to the position controller 201.

Figure 4:
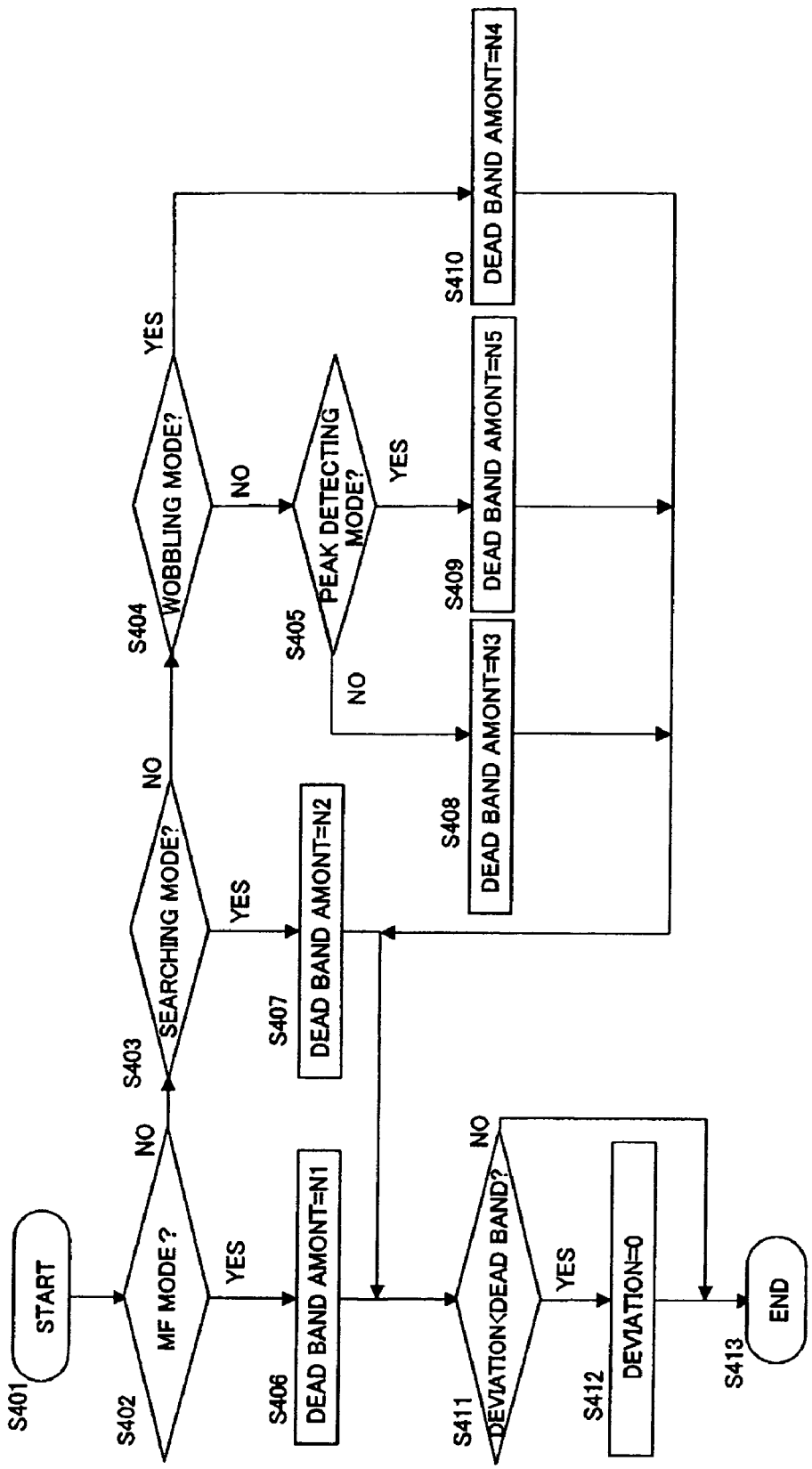
FIG. 4 is a flow chart of the dead band setting operation in Embodiment 2.

Next, the description will be made of the sequence to set the dead band amount in the dead-band controlling part 202 with reference to the flow chart in FIG. 4.

First, at S402, the dead-band controlling part 202 determines whether the current focus mode is the manual focus or the auto focus mode. When the current focus mode is the manual focus mode, the process proceeds to S406 to set the dead band amount to N1. When the current focus mode is the auto focus mode, the process proceeds to S403.

At S403, it is determined whether or not the mode information obtained from the CPU 8 shows the searching mode of the auto focus mode. When it is determined that the mode information shows the searching mode, the process proceeds to S407 to set the dead band amount to N2. When it is determined that the mode information does not show the searching mode, the process proceeds to S404.

At S404, it is determined whether or not the mode information shows the wobbling mode of the auto focus mode. When it is determined that the mode information shows the wobbling mode, the process proceeds to S410 to set the dead band amount to N4. When it is determined that the mode information does not show the wobbling mode, the process proceeds to S405.

At S405, it is determined whether or not the mode information shows the peak detecting mode of the auto focus mode. When it is determined that the mode information shows the peak detecting mode, the process proceeds to S409 to set the dead band amount to N5. When it is determined that the mode information does not show the peak detecting mode, the process proceeds to S408 to set the dead band amount to N3.

At S411, the value of the deviation signal is compared with the set dead band amount. When the value of the deviation signal is smaller than the dead band amount, the process proceeds to S412 to set the output value of the deviation signal to zero, and then the process is ended. When the value of the deviation signal is equal to or more than the dead band amount, the process is directly ended.

Figure 5:
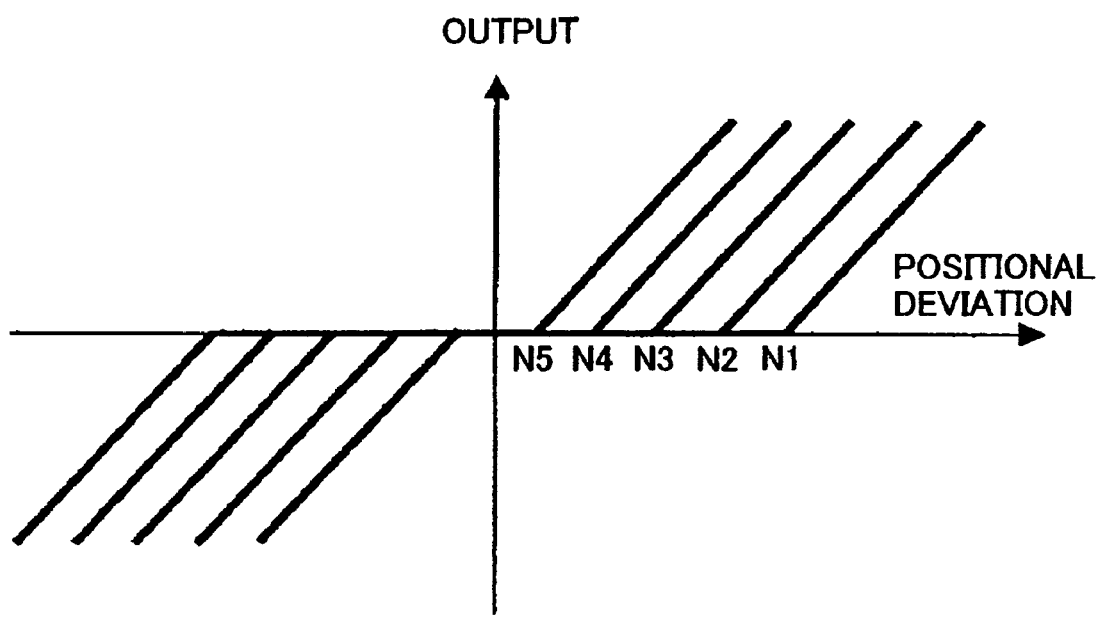
FIG. 5 is a chart showing the relationship between the dead band and the output of the deviation signal in Embodiment 2.
Figure 6:
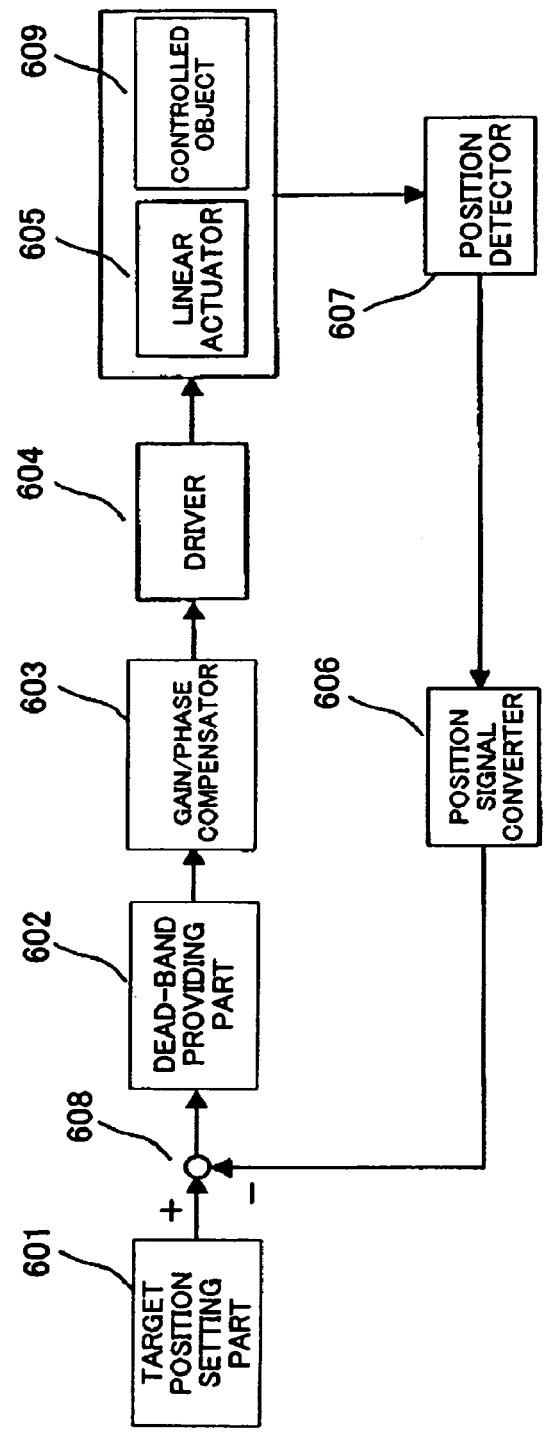
FIG. 6 is a block diagram showing the configuration of a conventional position control apparatus.
Figure 7:
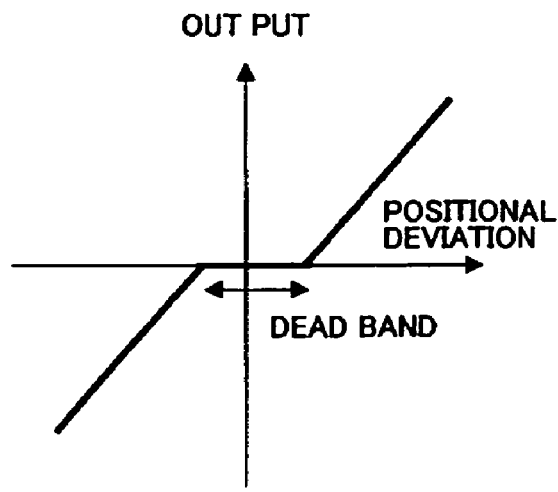
FIG. 7 is a chart showing the output characteristic of the positional deviation signal in the case of providing the dead band in the conventional position control apparatus.
Figure 8:
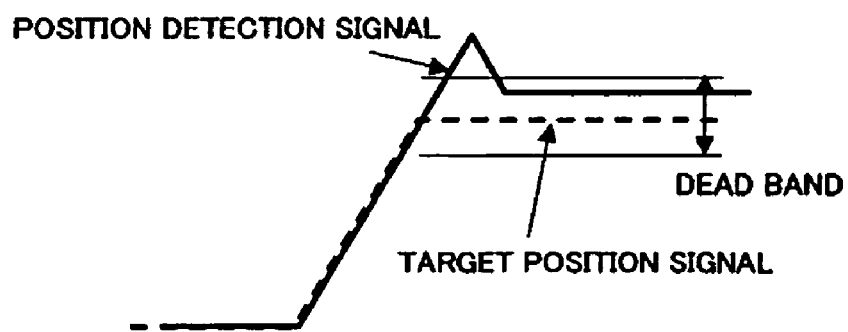
FIG. 8 is a chart showing the response characteristic of the position detection signal in the case of providing the dead band in the conventional position control apparatus.

FIG. 5 shows an example of the relationship between the input (positional deviation) and the output of the dead-band providing part in the case where the above-mentioned dead-band providing control is performed. The dead band amounts N1 to N5 become smaller in order from N1 to N5. This relationship is determined depending on that the priority is given to the positional accuracy or to the control stability and the operability, in the above-mentioned operation mode (or the control mode).

For example, in the manual focus mode, if the focus lens unit 5 is sensitive to a small movement of the MF operating part 13 caused by a user's erroneous operation, the operability of the manual focus deteriorates. Therefore, setting the largest dead band amount N1 in the manual focus mode can improve the operability of the manual focus.

In the wobbling mode of the auto focus mode, it is preferable that the wobbling operation range be as small as possible to shorten the time taken for the determination of the in-focus direction. Therefore, the second-smallest dead band amount N4 is set in the wobbling mode. Since the searching mode does not requires high positional accuracy, the second-largest dead band amount N2 is set in the searching mode.

On the other hand, it is necessary to specify the final in-focus position with accuracy as high as possible in the peak detecting mode, so that the smallest dead band amount N5 is set in the peak detecting mode. In the case other than these modes, the standard dead band amount N3 is set.

There is a possibility that an in-focus state cannot be obtained when the dead band amount is too large. Therefore, it is necessary that the maximum dead band amount is smaller than the value of Fδ. "F" is the F-number of the aperture stop, and "δ" is the diameter of a permissible circle of confusion of the image-pickup element.

As described above, each of the embodiments provides the dead band that is a non-controlled area for the deviation signal of the target position signal and the position detection signal, and further changes the dead band amount according to the control modes for controlling the object. Accordingly, the most appropriate dead band amount is set according to the control mode, thereby making it possible to achieve a position control apparatus or an optical apparatus with a good performance.

In other words, in each of the embodiments, the dead band (that is, the predetermined range) is set optimally depending on the control modes in which the required positional accuracies and the driving conditions are different from each other. Therefore, it is possible to prevent disadvantages caused by the absence of a dead band while achieving the required accuracy of positional control.

Furthermore, the present invention is not limited to these preferred embodiments and various variations and modifications may be made without departing from the scope of the present invention.

This application claims foreign priority benefits based on Japanese Patent Application No. 2005-170888, filed on Jun. 10, 2005, which is hereby incorporated by reference herein in its entirety as if fully set forth herein.

What is claimed is:

1. An optical apparatus comprising:
a focus lens configured to be movable along an optical axis direction;
an actuator configured to drive the focus lens;
a position detector configured to detect a position of the focus lens;
a target position setting part configured to set a target position of the focus lens,
wherein the target position setting part, in a manual focus mode, defines the target position of the focus lens based on an operation direction and an operation amount of a manual focus operation part, and
wherein the target position setting part, in an autofocus mode, defines the target position of the focus lens based on an autofocus evaluation value obtained from an image signal processor;
a dead-band controlling part configured to set an amount of dead band different between the manual focus mode and the autofocus mode,
wherein the amount of dead band in the manual focus mode is set larger than that in the autofocus mode; and
a controller configured to control the actuator by a feedback control so that the position of the focus lens approaches a target position based on the difference between the position of the focus lens, which is detected by the position detector, and the target position, which is set by the target position setting part,
wherein, in the manual focus mode:
when the difference between the position of the focus lens, which is detected by the position detector, and the target position, which is set by the target position setting part, is within the amount of dead band, the controller controls the actuator so that the focus lens is not driven,
when the difference is larger than a range of the amount of dead band, the controller controls the actuator so that the focus lens approaches the target position, and
wherein, in the autofocus mode:
when the difference between the position of the focus lens, which is detected by the position detector, and the target position, which is set by the target position setting part, is within the amount of dead band, the controller controls the actuator so that the focus lens is not driven, and
when the difference is larger than a range of the amount of dead band in the autofocus mode, the controller controls the actuator so that the focus lens approaches the target position.

2. The optical apparatus according to claim 1, wherein:
the autofocus mode includes an in-focus-direction determining mode to perform a control for determining a direction increasing the autofocus evaluation value by performing a wobbling operation of the focus lens, an in-focus-position searching mode to perform a control for driving the focus lens with respect to each predetermined amount until the autofocus evaluation value approaches a peak of the autofocus evaluation value, and an in-focus-position determining mode to perform a control for determining a position of the focus lens where the autofocus evaluation value is the peak by reciprocating the focus lens with a predetermined move width, and
the dead-band controlling part sets the amount of dead band in the manual focus mode, the in-focus-position searching mode, the in-focus-direction determining mode, and the in-focus-position determining mode, in decreasing order.

3. The optical apparatus according to claim 1, further comprising:
an aperture and an image-pickup element,
wherein maximum value of the predetermined range is smaller than Fδ when F is an F-number of the aperture and δ is a diameter of a permissible circle of confusion of the image-pickup element.

* * * * *